Sept. 8, 1970          C. F. BACHLE          3,527,264
COOLING MEANS FOR VARIABLE COMPRESSION RATIO PISTON ASSEMBLY
Filed March 14, 1968          2 Sheets-Sheet 1
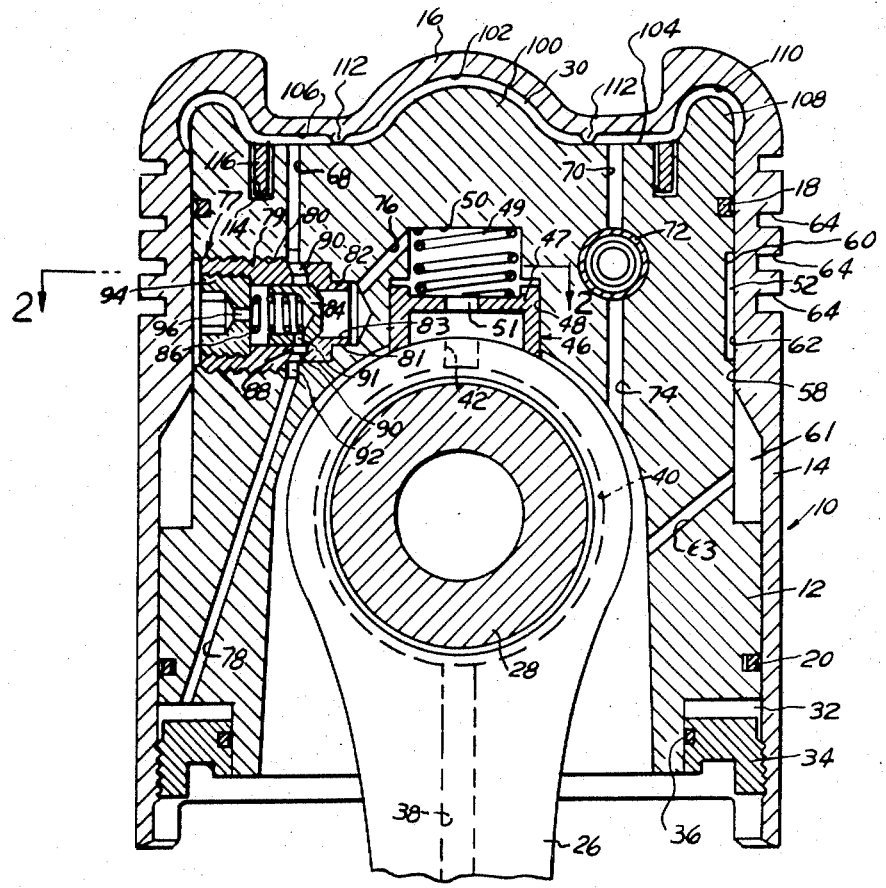
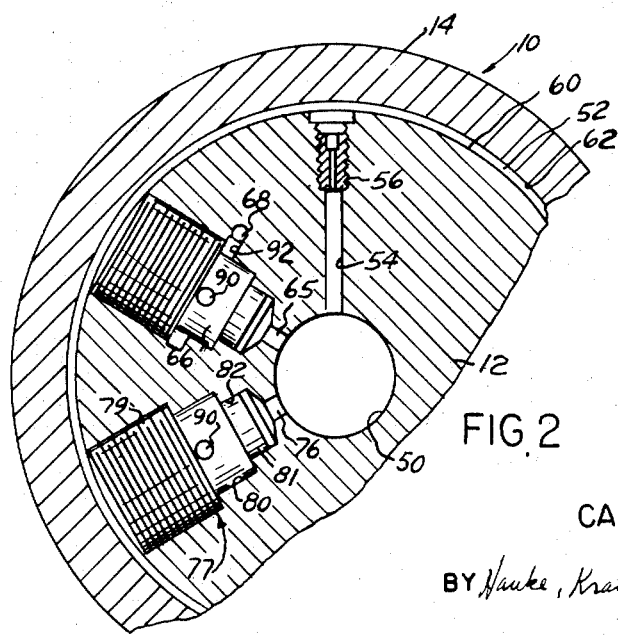
INVENTOR
CARL F. BACHLE
BY Hauke, Kraus, Gifford, & Patalidis
ATTORNEYS

INVENTOR
CARL F. BACHLE

BY Hauke, Kruss, Gifford, E Patalide

ATTORNEYS

United States Patent Office 3,527,264
Patented Sept. 8, 1970

3,527,264
COOLING MEANS FOR VARIABLE COMPRESSION RATIO PISTON ASSEMBLY
Carl F. Bachle, Grosse Pointe, Mich., assignor to Continental Aviation and Engineering Corporation, Detroit, Mich., a corporation of Virginia
Filed Mar. 14, 1968, Ser. No. 713,072
Int. Cl. F02b 75/04; F01p 3/10
U.S. Cl. 123—48
10 Claims

ABSTRACT OF THE DISCLOSURE

A two-part variable compression ratio piston assembly having an outer member movable relative to an inner member to vary the compression ratio of an internal combustion engine and a hydraulic system for automatically controlling relative movement of the members to maintain a predetermined maximum combustion chamber pressure. The hydraulic system includes an upper and a lower chamber which expand and contract conversely upon relative movement of the piston members and a system for supplying and discharging an incompressible fluid from these chambers in a manner which gradually increases the compression ratio of the engine until a predetermined maximum combustion chamber pressure has been achieved and which tends to maintain the maximum combustion chamber pressure after it has been achieved. The inner member is provided with a crown contoured to closely fit the top of the outer member to produce a scrubbing or pumping effect to reduce the operating temperatures of the piston assembly during an operational position in which the temperatures are most critical.

BACKGROUND OF THE INVENTION

Field of the invention

The present invention relates to variable compression ratio (VCR) piston assemblies such as those disclosed in prior U.S. Pats. Nos. 3,156,162; 3,161,112; 3,185,137; 3,185,138; 3,303,831 and 3,311,096.

Description of the prior art

In the disclosures of these patents an inner piston member or carrier is connected in the usual manner to a connecting rod and an outer piston member or shell is carried by and is movable axially relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the members. An incompressible fluid, such as lubrication oil, is supplied to these chambers in a manner which automatically regulates movement of the members to gradually increase the compression ratio until a predetermined combustion chamber pressure has been achieved. The hydraulic system then varies the movement of the members in a manner which tends to maintain a uniform maximum combustion chamber pressure. In the constructions disclosed in these patents intense heats are generated in the piston members and the highest thermal loading occurs when the upper chamber is contracted and the members are therefore in their closest position.

SUMMARY OF THE PRESENT INVENTION

The present invention provides a construction for a two-part variable compression ratio (VCR) piston in which cooling is produced during the critical period when the members are in the position contracting the upper chamber. To produce this result the crown of the inner member is very closely contoured to the top of the outer piston member and spacers are provided so that approximately .0001" clearance is achieved at the position of the members which produces the extreme contracted condition of the upper chamber.

Piston cycle movement then produces a pumping and scrubbing effect which results in reduced metal temperatures. This effect increases as the members come closer together so the effect is greatest when the highest thermal loading occurs.

To aid in this pumping action a ring is provided which fits loosely within an annular groove provided in the top of the inner piston. Piston movement then will cause the ring to move in and out of the groove to produce a pumping action.

DESCRIPTION OF THE DRAWINGS

The advantages and features of the present invention will become more apparent upon reference to the following description of several preferred embodiments thereof. The description makes reference to the accompanying drawings in which like reference characters refer to like parts throughout the several views and in which:

FIG. 1 is a longitudinal cross-sectional view of a piston assembly embodying one preferred construction of the present invention;

FIG. 2 is a fragmentary cross-sectional view taken substantially on line 2—2 of FIG. 1;

DESCRIPTION OF SEVERAL PREFERRED EMBODIMENTS

Figure 3:
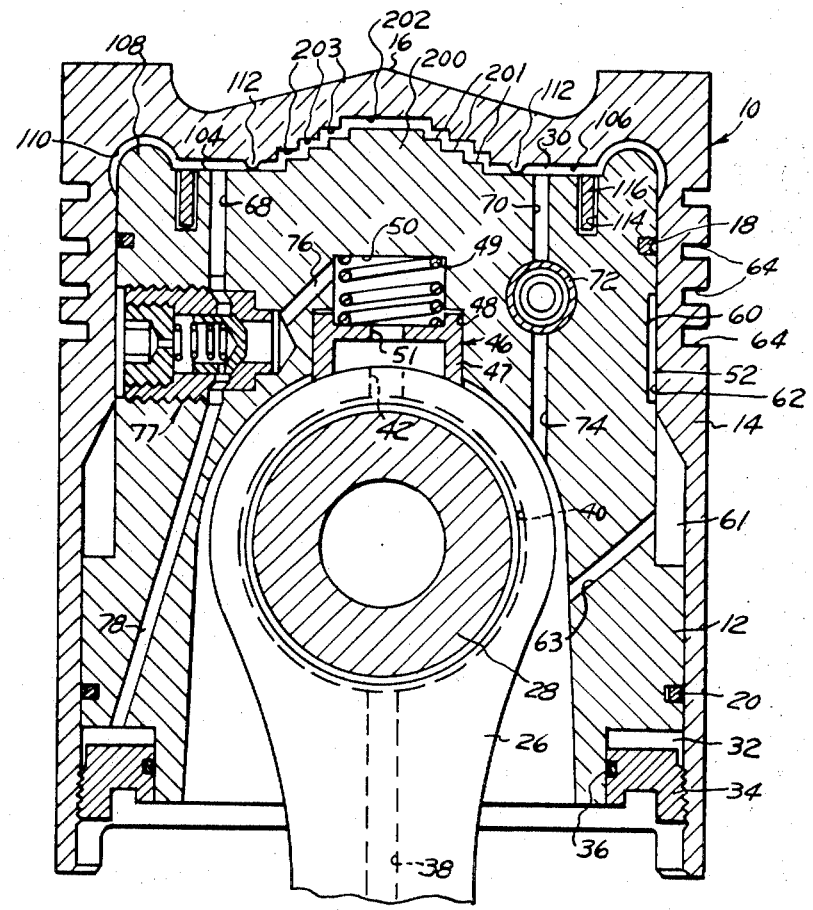
FIG. 3 is a view similar to FIG. 1 but illustrating yet another preferred embodiment of the present invention.

Now referring to the drawings for a more detailed description of the present invention, a preferred variable compression ratio (VCR) piston assembly 10 is illustrated in FIGS. 1 and 2 as comprising an inner member or piston pin carrier 12 carrying on its outer surface an outer member or shell 14. The outer member 14 has a crown 16 which serves as the head of the piston and which forms a movable wall of the lower boundary of the combustion chamber of the engine. Inner member 12 is axially slidable within and with respect to the outer member 14 and is provided with rings 18 and 20 which engage the inner surfaces of the outer member 14 and provide a fluid tight seal between these surfaces. Inner member 12 is linked to the crankshaft (not shown) of the engine by a connecting rod 26 and a wrist pin 28 in the conventional manner.

Thus the inner member 12 is movable axially between fixed upper and lower limits in the manner of a conventional piston while the outer member 14 can move axially upwardly and downwardly relative to the inner member 12 in a manner to be presently described. An upper variable volume chamber 30 is formed intermediate the upper surface of the inner member 12 and the lower surface of the crown 16. A lower variable volume chamber 32 is formed intermediate the lower surface formed by an annular recess at the lower end of the inner member 12 and by the upper surface of a ring 34 fixed to the outer member 14. A sealing ring 36 prevents fluid leakage from the lower chamber 32 intermediate the adjacent surfaces of the inner member 12 and the ring 34.

The ring 34 and the lower surface of the crown 16 defining the upper chamber 30 provide the limits of axial movement of the outer member 14 with respect to the inner member 12. This relative movement provides a variable height from the center of the wrist pin 28 to the top of the piston crown 16 to thereby vary the compression ratio of the engine by varying the clearance volume of the combustion chamber. This movement of the outer member 14 relative to the inner member 12 is automatically controlled by regulating the flow of an incompressible fluid into and out of the chambers 30 and 32. The control fluid preferably comprises oil supplied to the piston 10 from the usual pressurized lubricating oil supply of the engine by an oil passage 38 in the connecting rod 26. The passage 38 preferably connects with an annular groove 40 encircling the piston pin and leading to an outlet 42. A slipper collector assembly generally indicated at 46 comprising a recessed member 47 is disposed in a cavity 48 formed in the inner member 12 and is urged by a spring 49 carried in a cavity 50 into engagement with the upper surface of the connecting rod 26 to collect the oil discharging from the outlet 42 and direct it through a central opening 51 provided in the member 47 to the cavity 50.

Oil is fed from the cavity 50 in three separate flow paths leading respectively to the upper chamber 30, the lower chamber 32 and an annular cooling chamber 52. The cooling chamber 52 is defined by an extent groove 60 formed in the inner member 12 and by an inner wall 62 of the outer member 14, the chamber 52 being located adjacent the external piston ring grooves 64 formed in the outer member 14.

As can best be seen in FIG. 2 oil is fed from the cavity 50 to the cooling chamber 52 by a radial passage 54 in which is threadably secured a metering plug 56. As can be seen in FIG. 1 oil is discharged downwardly from the chamber 52 via an annular clearance space 58 intermediate the outer surface of the inner member 12 and the wall 62 of the outer member 14 to a larger space 61. A passage 63 provides the means for draining the oil to the crankcase sump of the engine.

As shown in FIG. 2 oil is fed from the cavity 50 to the upper chamber 30 by a second radial passage 65 which communicates through a one-way check valve 66 and a substantially vertical passage 68. As can be seen in FIG. 1 oil is discharged from the upper chamber 30 through a passage 70 under the control of a pressure regulating discharge valve 72 which opens to release oil to a drainage passage 74 when oil pressure in the chamber 30 exceeds a predetermined value.

Oil is fed from the cavity 50 to the lower chamber 32 via a third radial passage 76 which leads to a combination inlet and discharge valve assembly 77. Valve assembly 77 controls the supply of oil to and from a combination supply and discharge passage 78 running downwardly in inner member 12 from the valve assembly 77 to the lower chamber 32. The valve assembly 77 and the fluid system for supplying fluid to and discharging fluid from the upper and lower chambers 30 and 32 is the subject of U.S. Pat. No. 3,156,162 referred to above and assigned to the assignee of the present invention. As more clearly described in that patent and as can be seen in FIGS. 1 and 2 the valve assembly 77 comprises a cylindrical casing 79 threaded into a bore 80 which extends from the cooling groove 52 radially into the inner piston member 12 and which intersects passages 76 and 78. A reduced diameter nose 81 of the casing 79 extends into a counterbore 82. The casing 79 is provided with an axial inlet passage 83. A valve member 84 is urged by a spring 86 toward a position closing fluid flow from the inlet passage 83 to an internal annular groove 88 formed in the casing 79 and communicating with the passage 78 by a plurality of ports 90 formed in the casing 79 and connecting with an annular groove 92. A plug 94 provides the seat for the spring 86 and is provided with a restricted orifice 96 registering with the cooling chamber 52.

The piston assembly as it has thus far been described operates substantially as follows:

Assuming that the combustion chamber pressure is below a predetermined maximum value which the VCR piston 10 is designed to maintain and that the upper and lower chambers 30 and 32 are both filled with oil, as the piston member 10 decelerates upon approaching top dead center position at the end of the exhaust stroke and then accelerates in the opposite direction on the intake stroke the momentum of the outer member 14 tends to force it upwardly relative to the inner member 12, thereby raising the oil pressure in the lower chamber 32 above that existing in the cavity 50 and the passage 76. The oil pressure in the lower chamber 32 is transmitted via the column of oil in the passage 78 to the body of oil contained in the interior of the valve member 84. Thus, as the ring 34 is forced upwardly because of outer member 14 momentum, oil pressure behind the valve member 84 builds up and fluid pressure plus the force of the spring 86 move the valve member 84 to a closed position. Thereafter as the lower chamber pressure increases a predetermined amount of oil is forced out of the chamber 32 by way of the passage 78, the recess 92, the ports 90, 91 and the restricted orifice 96. Oil relieved through the orifice 96 flows into the cooling chamber 52 and is discharged to the engine crankcase sump through the drainage passage 63.

The controlled leakage of a predetermined amount of oil from the lower chamber 32 permits the outer member 14 to move a very small distance upwardly relative to the inner member 12 on each cycle of piston operation. This in turn increases the volume of and consequently reduces fluid pressure in the upper chamber 30. When the oil pressure in cavity 50 exceeds that in the upper chamber 30 valve 66 opens to admit oil from the cavity 50 to the upper chamber 30. This oil is trapped in the chamber 30 when the valve 66 closes due to reversal of the pressure differential between the chambers 30 and 50 upon reversal of momentum forces as the piston 10 approaches and passes through the bottom dead center position at the end of the intake stroke and at the beginning of the compression stroke.

The trapped oil prevents the outer member 14 from moving back downwardly relative to the inner member 12 until such time as the oil pressure in the chamber 30 exceeds the predetermined pressure at which the regulating valve 72 is set to open against the pressure of its spring. Hence, upward movement of the outer member 14 relative to the inner member 12 may occur for several cycles terminating when the cylinder clearance volume has been reduced to the point where combustion chamber pressure reaches the predetermined maximum volume which produces the valve opening pressure in chamber 30. Thereafter a state of relative equilibrium exists wherein the outer piston member 14 moves up and down very slightly relative to the inner piston member 12 in each cycle, its mean relative position being that producing the maximum combustion chamber pressure as predetermined by the setting of the valve 72.

If the combustion chamber pressure is suddenly increased, as by opening the engine throttle or increasing the load on the engine, valve 72 is designed to rapidly discharge the oil from the upper chamber 30 so that outer piston member 14 can move downwardly relative to inner member 12 thereby increasing the cylnder clearance and thus reducing combustion chamber pressure to the desired maximum value. Valve 72 is designed to permit outer member 14 to move downwardly more rapidly than the restricted orifice 96 permits it to move upwardly in each cycle. This insures rapid relief of the excessive combustion chamber pressure and eliminates oil pumping losses since the outer piston 14 must gradually creep back up to regain its orignal position relative to the inner piston 12.

The downward movement of the outer piston member 14 relative to inner piston member 12 increases the volume of the lower chamber 32 causing the oil pressure therein to drop to some value. As lower chamber pressure drops the oil pressure behind the valve member 84 is relieved via the ports 91 and 90 permitting it to open against the light pressure of the spring 86 as soon as the pressure in the passage 78 falls sufficiently below that in the passage 76. Oil from cavty 50 then flows by way of passage 76 and inlet 83 past the space between the valve member 84, through the groove 88, ports 90 and passage 78 to thereby supply the lower chamber 32 with sufficient volume to satisfy the pressure conditions.

The particular operation which has been described is substantially the same as that described in Patent No. 3,156,162. In the present construction and in contrast to the piston assemblies disclosed in the aforementioned patents the upper surface of the inner piston member 12 is contoured to closely fit the lower surface of the crown 16 of the outer member 14. In the particular embodiment of FIGS. 1 and 2 this is achieved by forming the upper surface of the inner member 12 with a central convex portion 100 adapted to fit closely within a corresponding concave portion 102 of outer member 14; a medial flat portion 104 encompasses the central convex portion 100 and is adjacent a corresponding flat portion 106 of the crown 16. A raised peripheral portion 108 is adapted to seat in a corresponding annular recess 110 provided in the crown 16. Although the drawings are distorted somewhat for a better understanding of the invention it is proposed that there be approximately .0001″ clearance in the closest position of the members 12 and 14 and to make certain that there is some clearance between these members at all times spacers 112 are preferably formed to extend downwardly from the flat portion 106. An annular recess 114 is formed in the flat portion 104 and an annular ring 116 is loosely mounted within the groove 114.

The closely contoured surfaces of the upper portion of the inner member 12 and the outer member 14 which define the upper chamber 30 in combination with the ring 116 moving in and out of the groove 114 provide a pumping or scrubbing action during the piston cycle movement. This pumping action moves the oil along the space between the lower surface of the crown 16 and upper surface of the inner member 12 to produce cooling which lowers the operating temperatures for the members 12 and 14. The reduced thermal loading permits a reduction of piston weight. The scrubbing action increases as the piston members come closer together and it is at this point that the highest thermal loading occurs.

Figure 4:
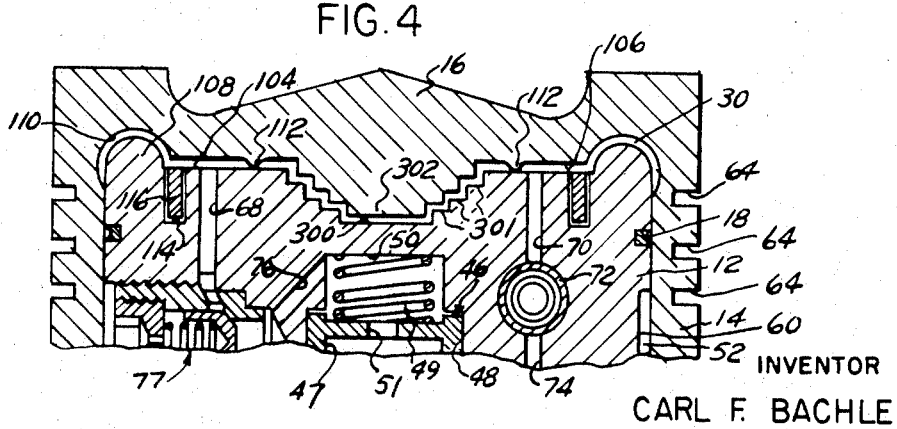
FIG. 4 is a fragmentary cross-sectional view of the upper portion of another preferred embodiment of the present invention.

The embodiments of FIGS. 3 and 4 are substantially similar to the embodiment of FIGS. 1 and 2, except that in FIG. 3 the central complementarily formed concave and convex sections 100 and 102, respectively, have been replaced in FIG. 3 by a raised central section 200 provided with a series of annular steps 201 formed by substantially right angle surfaces and which are adapted to fit closely within a corresponding set of annular grooves 203 formed in a corresponding recess section 202 of the outer member 14. The main portions of FIG. 3 are the same as those of the piston of FIGS. 1 and 2 and the design is simply another way to achieve the desired pumping action as the members move closer together.

Similarly FIG. 4 illustrates another preferred design in which the central portion of the inner member 12 is provided with a central recess 300 having a series of annular flat steps 301 formed by substantially right angle surfaces and adapted to receive a similarly formed convex section 302 formed on a lower surface of the crown 16.

It is apparent that a variable compression ratio piston assembly has been disclosed which differs from previous constructions provided for such assemblies in the provision of means for producing a cooling effect in those areas of the piston members defining the upper chamber. This is the critical portion of the piston member since it is the area which is closest to the combustion chamber of the engine. This cooling effect has been provided with little added expense to the manufacture and the assembly and does not otherwise affect the operation.

Having thus described my invention, I claim:

1. In an internal combustion engine, a piston having first and second members telescopically engaged for axial movement relative to one another in response to reciprocation with respect to the combustion chamber of the engine, and having a pressure fluid chamber within said piston which varies in volume in response to such relative movement and to variations in the qauntity of pressure fluid therein, the combination therewith of:

means for supplying pressure fluid to said chamber and valve means disposed within one of said members and operable to discharge fluid from said chamber only upon a predetermined pressure increase in said chamber, whereby upon fluid being supplied to said chamber said chamber expands in volume and upon fluid being discharged from said chamber said chamber contracts in volume; and, means carried by one of said members and movable with respect thereto to utilize the relative telescopic axial movement between said members upon contraction and expansion of said chamber to produce a pumping effect along the surface of said members defining said fluid chamber.

2. The combination as defined in claim 1 in which said last mentioned means includes the surface of one of said members defining said chamber being convexly formed and the other of said members having a concave surface formed complementary to and receiving said convexly formed surface upon relative telescopic axial movement of said members one toward the other.

3. In a variable compression ratio piston for an internal combustion engine, an inner and an outer member telscopically engaged for axial movement relative to one another to vary the compression ratio of the engine, a control system for regulating movement of said members including means defining a first chamber and a second chamber within said piston, and first and second chambers varying oppositely in volume in response to said telescopic axial movement of said members;

means for supplying a pressure fluid to said first chamber and valve means disposed in said inner member and operable to discharge fluid from said first chamber upon a predetermined pressure increase in said chamber whereby upon fluid being supplied to said first chamber said first chamber expands in volume and upon fluid being discharged from said first chamber said first chamber contracts in volume; and means carried by one of said members and movable with respect thereto to utilize the relative axial movement between said member for producing a pumping action directing fluid along the surfaces of said members.

4. The combination as defined in claim 3 and in which said last mentioned means comprises a concave portion formed in the surface of said inner member defining said first chamber and a convex portion formed in said outer member and adapted to extend into said concave portion upon relative telescopic axial movement of said outer member towards the inner member.

5. In an internal combustion engine, a piston having first and second members movable relative to one another in response to reciprocation with respect to the combustion chamber of the engine, and having a pressure fluid chamber within said piston which varies in volume in response to such relative movement and to variations in the quantity of pressure fluid therein, the combination therewith of means for supplying a pressure fluid to said chamber and means discharging fluid from said chamber upon a predetermined pressure increase in said chamber, whereby upon fluid being supplied to said chamber expands in volume and upon fluid being discharged from said chamber said chamber contracts in volume; means provided in said chamber and utilizing the relative movement between said members upon contraction and expansion of said chamber to produce a pumping effect along the surfaces of said members defining said fluid chamber, said last mentioned means comprising the surface of one of said members defining said chamber being convexly formed and the other of said members having a concave surface formed complementary to and receiving said convexly formed surface upon relative movement of said members one toward the other, said convex and concave surfaces being formed with a plurality of annular steps.

6. In an internal combustion engine, a piston having first and second members movable relative to one another in response to reciprocation with respect to the combustion chamber of the engine, and having a pressure fluid chamber within said piston which varies in volume in response to such relative movement and to variations in the quantity of pressure fluid therein, the combination therewith of means for supplying a pressure fluid to said chamber and means discharging fluid from said chamber upon a predetermined pressure increase in said chamber, whereby upon fluid being supplied to said chamber said chamber expands in volume and upon fluid being discharged from said chamber said chamber contracts in volume; means provided in said chamber and utilizing the relative movement between said members upon contraction and expansion of said chamber to produce a pumping effect along the surface of said members defining said fluid chamber, said last mentioned means comprising an annular groove provided in one of said members and a ring member loosely mounted within said groove and operable to move upwardly and downwardly with respect to said groove upon relative movement of said members.

7. The combination as defined in claim 6 and including said last mentioned means further comprising the surfaces of one of said members defining said chamber being convexly formed and the other of said members having a concavely formed surface complementary to and receiving said convexly formed surface upon relative movement of said members one toward the other.

8. In a variable compression ratio piston for an internal combustion engine, an inner and an outer member movable relative to one another to vary the compression ratio of the engine, a control system for regulating movement of said members including means defining a first chamber and a second chamber within said piston, said first and second chambers varying oppositely in volume in response to said movement of said members; means for supplying a pressure fluid to said first chamber and means discharging fluid from said first chamber upon a predetermined pressure increase in said first chamber; and means provided in said first chamber for producing a pumping action directing fluid along the surfaces of said members defining said first chamber upon relative movement of said members, said last mentioned means comprising an annular groove formed in the surface of said inner member defining said first chamber and a ring member loosely mounted within said recess.

9. The combination as defined in claim 8 and in which said last mentioned means further comprises a concave portion formed in the surface of said outer member defining said first chamber and a convex portion formed in said inner member and extending into said concave portion upon relative movement of said members one toward the other and said annular groove encompasses said convex portion.

10. In a variable compression ratio piston for an internal combustion engine, an inner and an outer member movable relative to one another to vary the compression ratio of the engine, a control system for regulating movement of said members including means defining a first chamber and a second chamber within said piston, said first and second chambers varying oppositely in volume in response to said movement of said members; means for supplying a pressure fluid to said first chamber and means discharging fluid from said first chamber upon a predetermined pressure increase in said first chamber; and means provided in said first chamber for producing a pumping action directing fluid along the surfaces of said members defining said first chamber upon relative movement of said members, said last mentioned means comprising a concave portion formed in the surface of said outer member defining said first chamber and a convex portion formed in said inner member and extending into said concave portion upon relative movement of said members one toward the other.

References Cited

UNITED STATES PATENTS

| | | | |
|---|---|---|---|
| 2,807,247 | 9/1957 | Cramer | 123—41.38 |
| 2,819,936 | 1/1958 | Cambeis | 123—41.38 |
| 2,926,975 | 3/1960 | Karde et al. | 123—41.38 |
| 3,205,878 | 9/1965 | Timour et al. | 92—82 |
| 3,417,739 | 12/1968 | Fryer. | |

MARK M. NEWMAN, Primary Examiner

D. HART, Assistant Examiner

U.S. Cl. X.R.

92—82; 123—41.38, 78